(12) United States Patent
Michalewich et al.

(10) Patent No.: US 11,844,983 B1
(45) Date of Patent: Dec. 19, 2023

(54) GOLF BALL CORE WITH TAILORED HARDNESS GRADIENT

(71) Applicant: Acushnet Company, Fairhaven, MA (US)

(72) Inventors: Michael Michalewich, Norton, MA (US); Doug Goguen, Lakeville, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 17/839,673

(22) Filed: Jun. 14, 2022

(51) Int. Cl.
*A63B 37/06* (2006.01)
*A63B 37/00* (2006.01)
*C08L 9/00* (2006.01)

(52) U.S. Cl.
CPC ...... *A63B 37/0063* (2013.01); *A63B 37/0074* (2013.01); *C08L 9/00* (2013.01); *C08L 2205/02* (2013.01)

(58) Field of Classification Search
CPC .............. A63B 37/005; A63B 37/0051; A63B 37/0063; A63B 37/0062
See application file for complete search history.

(56) References Cited

U.S. PATENT DOCUMENTS

| | | |
|---|---|---|
| 6,677,401 B2 | 1/2004 | Boehm et al. |
| 6,756,436 B2 | 6/2004 | Rajagopalan et al. |
| 6,774,187 B2 | 8/2004 | Voorheis et al. |
| 6,982,301 B1 | 1/2006 | Voorheis et al. |
| 6,992,135 B2 | 1/2006 | Boehm et al. |

*Primary Examiner* — Raeann Gorden
(74) *Attorney, Agent, or Firm* — Bradley Arant Boult Cummings LLP

(57) ABSTRACT

Compositions including a hardness agent and golf ball cores made from such compositions having a tailored hardness gradient are disclosed. The type and concentration of the components in the composition, including the hardness agent, affects the hardness, hardness gradient, and compression of cores made from the composition and, thus, can be used to produce a golf ball having desirable performance characteristics.

20 Claims, 2 Drawing Sheets

GOLF BALL CORE WITH TAILORED HARDNESS GRADIENT

FIELD OF THE INVENTION

The present disclosure relates generally to compositions for use in golf ball cores that provide for manipulation of the hardness gradient of such cores. More particularly, the present disclosure provides compositions and golf ball cores made from such compositions that provide an ability to tailor and/or improve certain ball performance results when such cores are used in a golf ball. In some respects, the present disclosure relates to golf ball cores with tailorable hardness gradients that, when used in golf balls, provide the ability to achieve one or more desired performance characteristics including, for example, spin on driver and short distance shots.

BACKGROUND OF THE INVENTION

The performance of a golf ball is affected by a variety of factors including the materials, weight, size, dimple pattern, and external shape of the golf ball. As a result, golf ball manufacturers are constantly improving or tweaking the performance of golf balls by adjusting the materials and construction of the ball as well as the dimple pattern and dimple shape.

For example, the resiliency and rebounding (Coefficient of Restitution) performance of the golf ball are generally driven by the composition and construction of the core. The spin rate and feel of the ball also are important properties that are affected by the composition and construction of the core. The spin rate refers to the rate of rotation of the golf ball after being hit with a club. Two factors that affect the spin rate of a golf ball are the hardness gradient of the core, i.e., the difference in hardness between the geometric center and outer surface of the core, and the compression of the core, i.e., how much the core deflects under a given load. Generally, changing the compression of a golf ball or golf ball core alters the spin rate of the golf ball similarly for both driver shots and short distance shots. For example, increasing the compression of a golf ball or golf ball core may cause a 10 percent increase in spin rates for both short distance and driver shots. In contrast, changing the hardness gradient of the golf ball core may affect the spin rate differently for driver shots and short distance shots. More specifically, an increase in the hardness gradient may result in a 15 percent increase in spin rate on short distance shots but only a 5 percent increase in spin rate on driver shots.

Most professionals and highly skilled amateurs (i.e., those who can control the spin of a golf ball) generally prefer balls with high spin rates to allow for better control in and around the green and draw and fade on approach shots. Indeed, these balls are beneficial for short distance shots made with irons and wedges. In contrast, recreational players who cannot necessarily control the spin of the ball will likely find that it is easier to play with a golf ball with low spin because the spin from a golf ball with a high spin rate can create more shot dispersion, i.e., more stray off to the left or right of the centerline, especially if the ball is hooked or sliced.

Meanwhile, the "feel" of the ball generally refers to the sensation that a player experiences when striking the ball with the club. Most players prefer balls having a soft feel, because the players experience a more natural and comfortable sensation when the club face makes contact with these balls. Balls having a softer feel are particularly desirable when making short shots around the green, because the player senses more with such balls. The feel of the ball primarily depends upon the hardness and compression of the ball.

Accordingly, there remains a need for golf ball cores having a hardness gradient that can be tailored to produce desired performance characteristics such as resiliency, rebounding, spin, and feel. In this aspect, it would be advantageous to tailor the core of a golf ball such that the finished golf ball has the desired amount of spin on short distance and driver shots for players having different levels of expertise as well as other advantageous properties, features, and benefits. For example, it would be beneficial to tailor the core of a golf ball so as to reduce shot dispersion for amateur players. Similarly, it would be advantageous to tailor the core of a golf ball such that the finished golf ball gives highly skilled players greater control over the shot. The present disclosure provides compositions for use in golf ball cores and golf balls containing such cores that allow for manipulation of the hardness gradient and, thus, manipulation or tailoring of desired performance characteristics.

SUMMARY OF THE INVENTION

The problems expounded above, as well as others, are addressed by the following inventions, although it is to be understood that not every embodiment of the inventions described herein will address each of the problems described above.

In some embodiments, the present disclosure provides a golf ball including a core and a cover layer disposed about the core, the core including: a rubber formulation including a base rubber and a hardening agent having a hardening agent concentration $HA_C$ and a hardening agent isomer number $HA_{LN}$; a geometric center hardness $H_C$; a surface hardness $H_S$; and a hardness gradient $H_{Gr}$ equal to the difference between $H_C$ and $H_S$, wherein the hardening agent is nitrophenol, and wherein $$\frac{HA_C * HA_{LN}}{1 - \frac{1}{H_{Gr}}} \geq 0.4.$$

In another embodiment, $$0.6 < \frac{HA_C * HA_{LN}}{1 - \frac{1}{H_{Gr}}} < 0.63.$$

In yet another embodiment, $$1.5 < \frac{HA_C * HA_{LN}}{1 - \frac{1}{H_{Gr}}} < 1.8.$$

In still another embodiment, $$2.0 < \frac{HA_C * HA_{LN}}{1 - \frac{1}{H_{Gr}}} < 2.5.$$

In some embodiments, $HA_C$ is about 0.1 to about 1.0 parts per hundred rubber. In one embodiment, $H_C$ is in the range of about 50 Shore C to about 85 Shore C, $H_S$ is in the range of about 65 Shore C to about 95 Shore C, and $H_S$ is greater than $H_C$. In another embodiment, the rubber formulation further comprises a co-agent, a filler, and an initiator. In yet another embodiment, the rubber formulation further comprises a radical scavenger. In still another embodiment, the base rubber is polybutadiene rubber, butyl rubber, or a blend thereof.

In other embodiments, the present disclosure provides a golf ball including a core and a cover layer disposed about the core, the core including a rubber formulation including a base rubber, an initiator having an initiator concentration $I_C$, and a hardening agent having a hardening agent concentration $HA_C$ and a hardening agent isomer number $HA_{LN}$; a geometric center hardness $H_C$; a surface hardness $H_S$; and a hardness gradient $H_{Gr}$ equal to the difference between $H_C$ and $H_S$, wherein the hardening agent is nitrophenol, and wherein $$\frac{HA_C * HA_{LN}}{1 - \frac{I_C}{H_{Gr}}} \geq 0.6.$$

In another embodiment, $$0.62 < \frac{HA_C * HA_{LN}}{1 - \frac{I_C}{H_{Gr}}} < 0.64.$$

In yet another embodiment, $$1.6 < \frac{HA_C * HA_{LN}}{1 - \frac{I_C}{H_{Gr}}} < 2.0.$$

In still another embodiment, $$2.4 < \frac{HA_C * HA_{LN}}{1 - \frac{I_C}{H_{Gr}}} < 2.7.$$

In one embodiment, $HA_C$ is about 0.1 to about 1.0 parts per hundred rubber. In another embodiment, $I_C$ is about 0.5 to about 3.0 parts per hundred rubber. In still another embodiment, $H_C$ is in the range of about 50 Shore C to about 85 Shore C, $H_S$ is in the range of about 65 Shore C to about 95 Shore C, and $H_S$ is greater than $H_C$.

In still other embodiments, the present disclosure provides a golf ball having a core and a cover layer disposed about the core, the core including: a rubber formulation including a base rubber and a hardening agent, wherein the hardening agent is a benzoic compound comprising a first functional group that is a nitro functional group and a second functional group that is selected from the group consisting of hydroxyl, amino, and sulfhydryl functional groups; a geometric center having a hardness; a geometric surface having a hardness; a hardness gradient equal to the difference in the geometric center hardness and the surface hardness, wherein the hardness gradient is between 2 Shore C and 42 Shore C.

In one embodiment, the hardening agent is nitrophenol. In another embodiment, the hardening agent is 2-nitrophenol and the hardness gradient is between 30 Shore C and 42 Shore C. In yet another embodiment, the cover layer comprises a material selected from the group consisting of polyurethanes, polyureas, and hybrids, copolymers, and blends thereof.

BRIEF DESCRIPTION OF THE DRAWINGS

Further features and advantages of the invention can be ascertained from the following detailed description that is provided in connection with the drawings described below.

DETAILED DESCRIPTION OF THE INVENTION

Figure 1:
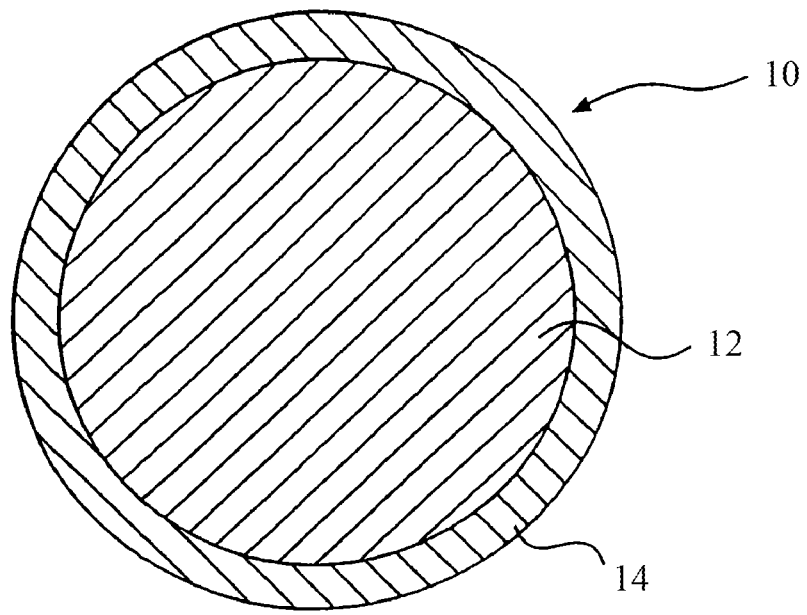
FIG. 1 is a cross-sectional view of a two-piece golf ball in accordance with an embodiment of the present disclosure.

The present disclosure relates to compositions that may be used to produce a desired hardness gradient, cores including such compositions that possess a positive hardness gradient, and golf balls including such cores. In some respects, the tailorable hardness gradient in the core provides the ability to increase or reduce driver spin when compared to a conventional golf ball hit under the same conditions. In addition, the tailorable hardness gradient in the core may be used to provide greater control on long shots as well as approach shots and greenside play.

While the golf ball core is functionally different from the other layers of the golf ball and operates somewhat independently, the core of the present disclosure greatly influences the overall performance of the finished golf ball including such a core. Without being bound by any particular theory, performance characteristics of a finished golf ball that contains the core of the present disclosure may be tailored by changing the core composition. For example, altering the core composition and, thus, the hardness gradient, may have a significant effect on long shots, e.g., shots off of a driver, and approach shots, e.g., shots made with irons and wedges. In fact, adjusting the hardness gradient of cores made in accordance with this present disclosure, even in relatively small amounts, can significantly affect how a golf ball performs on long and short distance shots. Similarly, adjusting the hardness gradient of the core may allow for tailoring of other properties of the finished golf ball. The core formulations, cores, golf balls, and resulting performance characteristics are discussed in greater detail below.

Core Formulations

Formulation

A golf ball of the present disclosure may contain a single-or multi-layered core. One or more of the layers of the core may comprise a rubber formulation. In one embodiment, the rubber formulation includes a base rubber in an amount of about 5 percent to 100 percent by weight based on the total weight of the rubber formulation. In one embodiment, the base rubber is included in the rubber formulation in an amount within a range having a lower limit of about 5 percent or 10 percent or 20 percent or 30 percent or 40 percent or 50 percent or 55 percent and an upper limit of about 60 percent or 70 percent or 80 percent or 90 percent or 95 percent or 100 percent. For example, the base rubber may be present in the rubber formulation in an amount of about 30 percent to about 80 percent by weight based on the total weight of the rubber formulation. In another example, the rubber formulation includes about 40 percent to about 70 percent base rubber based on the total weight of the rubber formulation.

Concentrations are in parts per hundred (phr) unless otherwise indicated. As used herein, the term, "parts per hundred," also known as "phr" or "pph" is defined as the number of parts by weight of a particular component present in a mixture, relative to 100 parts by weight of the polymer component. Mathematically, this can be expressed as the weight of an ingredient divided by the total weight of the polymer, multiplied by a factor of 100.The base rubber may be polybutadiene, polyisoprene, ethylene propylene rubber, ethylene-propylene-diene rubber, styrene-butadiene rubber, styrenic block copolymer rubbers, polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and blends of two or more thereof. In one embodiment, the rubber formulation includes polybutadiene rubber, butyl rubber, or a blend thereof as the base rubber.

For example, the core may be formed from a rubber formulation that includes polybutadiene as the base rubber. Polybutadiene is a homopolymer of 1,3-butadiene. The double bonds in the 1,3-butadiene monomer are attacked by catalysts to grow the polymer chain and form a polybutadiene polymer having a desired molecular weight. Any suitable catalyst may be used to synthesize the polybutadiene rubber depending upon the desired properties. In one embodiment, a transition metal complex (for example, neodymium, nickel, or cobalt) or an alkyl metal such as alkyl lithium is used as a catalyst. Other catalysts include, but are not limited to, aluminum, boron, lithium, titanium, and combinations thereof. The catalysts produce polybutadiene rubbers having different chemical structures. In a cis-bond configuration, the main internal polymer chain of the polybutadiene appears on the same side of the carbon-carbon double bond contained in the polybutadiene. In a trans-bond configuration, the main internal polymer chain is on opposite sides of the internal carbon-carbon double bond in the polybutadiene. The polybutadiene rubber can have various combinations of cis- and trans-bond structures. For example, the polybutadiene rubber may have a 1,4 cis-bond content of at least 40 percent. In another embodiment, the polybutadiene rubber has a 1,4 cis-bond content of greater than 80 percent. In still another embodiment, the polybutadiene rubber has a 1,4 cis-bond content of greater than 90 percent. In general, polybutadiene rubbers having a high 1,4 cis-bond content have high tensile strength and rebound.

In some embodiments, the rubber formulation of the present disclosure includes a blend of different polybutadiene rubbers. In this embodiment, the rubber formulation may include a blend of a first polybutadiene rubber and a second polybutadiene rubber in a ratio of about 5:95 to about 95:5. For example, the rubber formulation may include a first polybutadiene rubber and a second polybutadiene rubber in a ratio of about 10:90 to about 90:10 or about 15:85 to about 85:15 or about 20:80 to about 80:20 or about 30:70 to about 70:30 or about 40:60 to about 60:40. In other embodiments, the rubber formulation may include a blend of more than two polybutadiene rubbers or a blend of polybutadiene rubber(s) with any of the other elastomers discussed above.

The polybutadiene rubber may have a relatively high or low Mooney viscosity. Generally, polybutadiene rubbers of higher molecular weight and higher Mooney viscosity have better resiliency than polybutadiene rubbers of lower molecular weight and lower Mooney viscosity. However, as the Mooney viscosity increases, the milling and processing of the polybutadiene rubber generally becomes more difficult. Blends of high and low Mooney viscosity polybutadiene rubbers may be prepared as is described in U.S. Pat. Nos. 6,982,301 and 6,774,187, the disclosures of which are hereby incorporated by reference, and used in accordance with this invention. In general, the lower limit of Mooney viscosity may be about 30 or 35 or 40 or 45 or 50 or 55 or 60 or 70 or 75 and the upper limit may be about 80 or 85 or 90 or 95 or 100 or 105 or 110 or 115 or 120 or 125 or 130. For example, the polybutadiene used in the rubber formulation may have a Mooney viscosity of about 30 to about 80 or about 40 to about 60.

Examples of commercially available polybutadiene rubbers that can be used in rubber formulations in accordance with this invention, include, but are not limited to, BR 01 and BR 1220, available from BST Elastomers of Bangkok, Thailand; SE BR 1220LA and SE BR1203, available from DOW Chemical Co of Midland, Mich.; BUDENE 1207, 1207s, 1208, and 1280 available from Goodyear, Inc of Akron, Ohio; BR 01, 51 and 730, available from Japan Synthetic Rubber (JSR) of Tokyo, Japan; BUNA CB 21, CB 22, CB 23, CB 24, CB 25, CB 29 MES, CB 60, CB Nd 60, CB 55 NF, CB 70 B, CB KA 8967, and CB 1221, available from Lanxess Corp. of Pittsburgh. Pa.; BR1208, available from LG Chemical of Seoul, South Korea; UBEPOL BR130B, BR150, BR150B, BR150L, BR230, BR360L, BR710, and VCR617, available from UBE Industries, Ltd. of Tokyo, Japan; EUROPRENE NEOCIS BR 60, INTENE 60 AF and P3OAF, and EUROPRENE BR HV80, available from Polimeri Europa of Rome, Italy; AFDENE 50 and NEODENE BR40, BR45, BR50 and BR60, available from Karbochem (PTY) Ltd. of Bruma, South Africa; KBR 01, NdBr 40, NdBR-45, NdBr 60, KBR 710S, KBR 710H, and KBR 750, available from Kumho Petrochemical Co., Ltd. Of Seoul, South Korea; DIENE 55NF, 70AC, and 320 AC, available from Firestone Polymers of Akron, Ohio; and PBR-Nd Group II and Group III, available from Nizhnekamskneftekhim, Inc. of Nizhnekamsk, Tartarstan Republic.

In another embodiment, the core is formed from a rubber formulation including butyl rubber. Butyl rubber is an elastomeric copolymer of isobutylene and isoprene. Butyl rubber is an amorphous, non-polar polymer with good oxidative and thermal stability, good permanent flexibility and high moisture and gas resistance. Generally, butyl rubber includes copolymers of about 70 percent to about 99.5 percent by weight of an isoolefin, which has about 4 to 7 carbon atoms, for example, isobutylene, and about 0.5 percent to about 30 percent by weight of a conjugated multiolefin, which has about 4 to 14 carbon atoms, for example, isoprene. The resulting copolymer contains about 85 percent to about 99.8 percent by weight of combined isoolefin and about 0.2 percent to about 15 percent of combined multiolefin. A commercially available butyl rubber includes Bayer Butyl 301 manufactured by Bayer AG.

In still another embodiment, the rubber formulation used to form the core includes a blend of polybutadiene and butyl rubber. In this embodiment, the rubber formulation may include a blend of polybutadiene and butyl rubber in a ratio of about 10:90 to about 90:10. For example, the rubber formulation may include a blend of polybutadiene and butyl rubber in a ratio of about 10:90 to about 90:10 or about 20:80 to about 80:20 or about 30:70 to about 70:30 or about 40:60 to about 60:40. In other embodiments, the rubber formulation may include polybutadiene and/or butyl rubber in a blend with any of the other elastomers discussed above.

The rubber formulations of the present disclosure include a hardening agent. Without being bound to any particular theory, the hardening agent may affect the hardness of the core and the hardness gradient across the core. Suitable hardening agents include, but are not limited to, benzoic compounds comprising a nitro functional group and one of a hydroxyl, amino, or sulfhydryl functional group. Nonlimiting examples of hardening agents include nitrophenol, nitroaniline, and nitrothiophenol. Different isomers of the hardening agent may be used such as, for example, 2-nitrophenol, 3-nitrophenol, 4-nitrophenol, 2-nitroaniline, 3-nitroaniline, 4-nitroaniline, 2-nitrothiophenol, 3-nitrothiophenol, 4-nitrothiophenol, and combinations thereof. Without being bound by any particular theory, different isomers of the hardening agent may affect the hardness of the core differently and produce different hardness gradients across the core. Some hardening agents, for example nitrophenol, may be advantageous because they are safe and/or easy to handle during manufacturing.

The hardening agent may be included in the rubber formulation in varying amounts depending on the desired characteristics of the golf ball core. For example, the hardening agent may be used in an amount of 0.05 to about 3 parts by weight per 100 parts of the total rubber. In one embodiment, the rubber formulation of the core includes about 0.1 to about 1.5 or about 0.1 to about 1 part by weight hardening agent per 100 parts of the total rubber. In another embodiment, the hardening agent is included in the rubber formulation in an amount of about 0.2 to about 0.7 parts by weight per 100 parts of the total rubber. In still another embodiment, the rubber formulation includes about 0.2 to about 0.4 or about 0.3 to about 0.5 or about 0.4 to about 0.6 parts by weight hardening agent per 100 parts of the total rubber.

In some respects, the amount of hardening agent in the rubber formulation required to produce the desired hardness gradient may differ based on the compound, and even the particular isomer of the compound, used as the hardening agent. For example, when the rubber formulation includes 2-nitrophenol, which has a nitro functional group ortho to a hydroxyl functional group, the hardening agent may be used in an amount of about 0.2 to about 0.4 parts by weight per 100 parts of the total rubber to achieve the desired hardness gradient. In contrast, when the rubber formulation includes either 3-nitrophenol, which has a nitro functional group meta to a hydroxyl functional group, or 4-nitrophenol, which has a nitro functional group para to a hydroxyl functional group, it may be useful to use about 0.4 to about 0.6 parts by weight hardening agent per 100 parts of the total rubber to achieve the desired hardness gradient. Without being bound by any particular theory, the relative positions of the functional groups on disubstituted benzoic hardening agents are believed to influence the effectiveness of the compound as a hardening agent. Accordingly, the amount of hardening agent needed to produce a desired hardness gradient may change when different isomers within a class of compounds are used.

The rubber formulations further include a reactive cross-linking co-agent. Suitable co-agents include, but are not limited to, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. In one embodiment, the co-agent is one or more metal salts of acrylates, diacrylates, methacrylates, and dimethacrylates, wherein the metal is selected from magnesium, calcium, zinc, aluminum, lithium, and nickel. In another embodiment, the co-agent includes one or more zinc salts of acrylates, diacrylates, methacrylates, and dimethacrylates. For example, the co-agent may be zinc diacrylate (ZDA). In another embodiment, the co-agent may be zinc dimethacrylate (ZDMA). An example of a commercially available zinc diacrylate includes Dymalink® 526 manufactured by Cray Valley.

The co-agent may be included in the rubber formulation in varying amounts depending on the desired characteristics of the golf ball core. For example, the co-agent may be used in an amount of about 25 to about 50 parts by weight per 100 parts of the total rubber. In one embodiment, the rubber formulation of the core includes about 35 to about 48 parts by weight co-agent per 100 parts of the total rubber. In another embodiment, the rubber formulation includes about 38 to about 45 or about 39 to about 42 parts by weight co-agent per 100 parts of total rubber. In another embodiment, the co-agent is included in the rubber formulation of the core in an amount of about 29 to about 37 or about 31 to about 35 parts by weight per 100 parts of the total rubber. In still another embodiment, the rubber formulation includes about 25 to about 33 or about 27 to about 31 parts by weight co-agent per 100 parts of the total rubber.

In some respects, the amount of co-agent in the rubber formulation may be altered based on the class of compounds, and the particular isomer within a class of compounds, used as the hardening agent. For example, when the rubber formulation includes 2-nitrophenol, the co-agent may be included in the rubber formulation in amount from about 37 to about 43 or about 39 to about 41 parts by weight per 100 parts of the total rubber. In another example, when the rubber formulation includes 3-nitrophenol, the co-agent may be included in the rubber formulation in amount from about 30 to about 36 or about 32 to about 34 parts by weight per 100 parts of the total rubber. In yet another example, when the rubber formulation includes 4-nitrophenol, the co-agent may be included in the rubber formulation in amount from about 26 to about 32 or about 28 to about 30 parts by weight per 100 parts of the total rubber. Without being bound to any particular theory, the concentration of co-agent may be altered to achieve the desired compression of the golf ball core when different hardening agent are used.

Radical scavengers such as a halogenated organosulfur, organic disulfide, or inorganic disulfide compounds may also be added to the rubber formulation. In one embodiment, a halogenated organosulfur compound included in the rubber formulation includes, but is not limited to, pentachlorothiophenol (PCTP) and salts of PCTP such as zinc pentachlorothiophenol (ZnPCTP). In another embodiment, ditolyl disulfide, diphenyl disulfide, dixylyl disulfide, 2-nitroresorcinol, and combinations thereof are added to the rubber formulation. An example of a commercially available radical scavenger includes Rhenogran® Zn-PTCP-72 manufactured by Rheine Chemie. The radical scavenger may be included in the rubber formulation in an amount of about 0.3 to about 1 part by weight per 100 parts of the total rubber. In one embodiment, the rubber formulation may include about 0.4 to about 0.9 parts by weight radical scavenger per 100 parts of the total rubber. In another embodiment, the rubber formulation may include about 0.5 to about 0.8 parts by weight radical scavenger per 100 parts of the total rubber.

The rubber formulation may also include filler(s). Suitable non-limiting examples of fillers include carbon black, clay and nanoclay particles, talc, glass (e.g., glass flake, milled glass, and microglass), mica and mica-based pigments (e.g., Iriodin® pearl luster pigments from The Merck Group), and combinations thereof. Metal oxide and metal sulfate fillers are also contemplated for inclusion in the rubber formulation. Suitable metal fillers include, for example, particulate, powders, flakes, and fibers of copper, steel, brass, tungsten, titanium, aluminum, magnesium, molybdenum, cobalt, nickel, iron, lead, tin, zinc, barium, bismuth, bronze, silver, gold, and platinum, and alloys and combinations thereof. Suitable metal oxide fillers include, for example, zinc oxide, iron oxide, aluminum oxide, titanium oxide, magnesium oxide, and zirconium oxide. Suitable metal sulfate fillers include, for example, barium sulfate and strontium sulfate. When included, the fillers may be in an amount of about 1 to about 25 parts by weight per 100 parts of the total rubber. In one embodiment, the rubber formulation includes at least one filler in an amount of about 5 to about 20 or about 8 to about 15 parts by weight per 100 parts of the total rubber. In another embodiment, the rubber formulation includes at least one filler in an amount of about 8 to about 14 or about 10 to about 12 parts by weight per 100 parts of the total rubber. In yet another embodiment, the rubber formulation includes at least one filler in an amount of about 10 to about 17 or about 12 to about 15 parts by weight per 100 parts of the total rubber. In yet another embodiment, the rubber formulation includes at least one filler in an amount of about 10 to about 16 or about 12 to about 15 parts by weight per 100 parts of the total rubber. In a further embodiment, the rubber formulation includes at least one filler in an amount of about 12 to about 18 or about 14 to about 16 parts by weight per 100 parts of the total rubber. An example of a commercially available barium sulfate filler includes PolyWate® 325 manufactured by Cimbar Performance Minerals.

In some aspects, the amount of filler in the rubber formulation may be altered based on the compound, and the particular isomer of the compound, used as the hardening agent. For example, when the rubber formulation includes 2-nitrophenol, at least one filler may be included in the rubber formulation in amount from about 9 to about 13 parts by weight per 100 parts of the total rubber. In another example, when the rubber formulation includes 3-nitrophenol, the filler may be included in the rubber formulation in amount from about 11 to about 16 parts by weight per 100 parts of the total rubber. In yet another example, when the rubber formulation includes 4-nitrophenol, the filler may be included in the rubber formulation in amount from about 13 to about 17 parts by weight per 100 parts of the total rubber.

In some embodiments, more than one type of filler may be included in the rubber formulation. For example, the rubber formulation may include a first filler in an amount from about 5 to about 20 or about 8 to about 17 parts by weight per 100 parts total rubber and a second filler in an amount from about 1 to about 10 or about 3 to about 7 parts by weight per 100 parts total rubber. In another example, the rubber formulation may include a first filler in an amount from about 7 to about 13 or about 9 to about 12 parts by weight per 100 parts total rubber and a second filler in an amount from about 2 to about 8 or about 4 to about 6 parts by weight per 100 parts total rubber. In yet another example, the rubber formulation may include a first filler in an amount from about 10 to about 15 or about 13 to about 14 parts by weight per 100 parts total rubber and a second filler in an amount from about 2 to about 9 or about 3 to about 7 parts by weight per 100 parts total rubber. In a further example, the rubber formulation may include a first filler in an amount from about 10 to about 15 or about 13 to about 14 parts by weight per 100 parts total rubber and a second filler in an amount from about 13 to about 18 or about 14 to about 16 parts by weight per 100 parts total rubber.

Antioxidants, processing aids, accelerators (for example, tetra methylthiuram), dyes and pigments, wetting agents, surfactants, plasticizers, coloring agents, fluorescent agents, chemical blowing and foaming agents, defoaming agents, stabilizers, softening agents, impact modifiers, antiozonants, as well as other additives known in the art, may also be added to the rubber formulation. Examples of suitable processing aids include, but are not limited to, high molecular weight organic acids and salts thereof. Suitable organic acids are aliphatic organic acids, aromatic organic acids, saturated mono-functional organic acids, unsaturated mono-functional organic acids, multi-unsaturated mono-functional organic acids, and dimerized derivatives thereof. In one embodiment, the organic acids include, but are not limited to, caproic acid, caprylic acid, capric acid, lauric acid, stearic acid, behenic acid, erucic acid, oleic acid, linoleic acid, myristic acid, benzoic acid, palmitic acid, phenylacetic acid, naphthalenoic acid, and dimerized derivatives thereof. The salts of organic acids include the salts of barium, lithium, sodium, zinc, bismuth, chromium, cobalt, copper, potassium, strontium, titanium, tungsten, magnesium, cesium, iron, nickel, silver, aluminum, tin, or calcium, salts of fatty acids, particularly stearic, behenic, erucic, oleic, linoelic or dimerized derivatives thereof.

The rubber formulation may be cured using conventional curing processes. Non-limiting examples of curing processes suitable for use in accordance with the present disclosure include peroxide-curing, sulfur-curing, high-energy radiation, and combinations thereof. In one embodiment, the rubber formulation includes a free-radical initiator selected from organic peroxides, high energy radiation sources capable of generating free-radicals, and combinations thereof. Suitable organic peroxides include, but are not limited to, dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof. In a particular embodiment, the free radical initiator is dicumyl peroxide, including, but not limited to Perkadox® BD-FF, commercially available from Akzo Nobel. Peroxide free-radical initiators may be present in the rubber formulation in an amount of at least 0.05 parts by weight per 100 parts of the total rubber, or an amount within the range having a lower limit of 0.05 parts or 0.1 parts or 1 part or 1.25 parts or 1.5 parts or 2.5 parts or 5 parts by weight per 100 parts of the total rubber, and an upper limit of 2.5 parts or 3 parts or 5 parts or 6 parts or 10 parts or 15 parts by weight per 100 parts of the total rubber. For example, the rubber formulation may include peroxide free-radical initiators in an amount of about 0.1 to about 3.5 or about 0.5 to about 3 or about 1.3 to about 2.2 parts by weight per 100 parts of the total rubber. In another example, the rubber formulation may include peroxide free-radical initiators in an amount of about 0.7 to about 1.8 or about 0.8 to about 1.2 or about 1.3 to about 1.7 parts by weight per 100 parts of the total rubber. In yet another example, the rubber formulation may include peroxide free-radical initiators in an amount of about 1.7 to about 2.8 or about 1.8 to about 2.2 or about 2.3 to about 2.7 parts by weight per 100 parts of the total rubber. In embodiments where a free-radical initiator is used, it may be desirable to combine the hardening agent into the rubber formulation prior to adding the free-radical initiator.

Properties

Hardness

The hardness of the geometric center of the core may be obtained according to the following: the core is first gently pressed into a hemispherical holder having an internal diameter approximately slightly smaller than the diameter of the core, such that the core is held in place in the hemispherical portion of the holder while concurrently leaving the geometric central plane of the center exposed. The core is secured in the holder by friction, such that it will not move during the cutting and grinding steps, but the friction is not so excessive that distortion of the natural shape of the core would result. The core is secured such that the parting line of the center is roughly parallel to the top of the holder. The diameter of the center is measured 90 degrees to this orientation prior to securing. A measurement is also made from the bottom of the holder to the top of the core to provide a reference point for future calculations. A rough cut is made slightly above the exposed geometric center of the core using a band saw or other appropriate cutting tool, making sure that the core does not move in the holder during this step. The remainder of the core, still in the holder, is secured to the base plate of a surface grinding machine. The exposed 'rough' surface is ground to a smooth, flat surface, revealing the geometric center of the core, which can be verified by measuring the height from the bottom of the holder to the exposed surface of the core, making sure that exactly half of the original height of the core, as measured above, has been removed to within 0.004 inches. Leaving the core in the holder, the geometric center of the core is confirmed with a center square and carefully marked, and the hardness is measured at the center mark according to ASTM D-2240.

Additional hardness measurements at any distance from the geometric center of the core can then be made by drawing a line radially outward from the geometric center mark and measuring the hardness at any given distance along the line, typically in 2 mm increments from the center of the core. The hardness at a particular distance from the geometric center should be measured along at least two, preferably four, radial arms located 180° apart, or 90° apart, respectively, and then averaged. All hardness measurements performed on a plane passing through the geometric center are performed while the core is still in the holder and without having disturbed its orientation, such that the test surface is constantly parallel to the bottom of the holder, and thus also parallel to the properly aligned foot of the durometer.

The outer surface hardness of the core (or any golf ball layer) is measured on the actual outer surface of the layer and is obtained from the average of a number of measurements taken from opposing hemispheres, taking care to avoid making measurements on the parting line of the core or on surface defects, such as holes or protrusions and preferably making the measurements prior to surrounding the layer of interest with an additional layer. Hardness measurements are made pursuant to ASTM D-2240 "Indentation Hardness of Rubber and Plastic by Means of a Durometer." Because of the curved surface, care must be taken to ensure that the golf ball or golf ball sub-assembly is centered under the durometer indenter before a surface hardness reading is obtained. A calibrated, digital durometer, capable of reading to 0.1 hardness units is used for the hardness measurements. The digital durometer must be attached to, and its foot made parallel to, the base of an automatic stand. The weight on the durometer and attack rate conforms to ASTM D-2240. It is worthwhile to note that, once an additional layer surrounds a layer of interest, the hardness of the layer of interest can be difficult to determine. Therefore, for purposes of the present disclosure, when the hardness of a layer is needed after the inner layer has been surrounded with another layer, the test procedure for measuring a point located 1 mm from an interface is used.

It should also be noted that there is a fundamental difference between "material hardness" and "hardness as measured directly on a golf ball" (or, as used herein, "surface hardness"). For purposes of the present disclosure, material hardness is measured according to ASTM D2240 and generally involves measuring the hardness of a flat "slab" or "button" formed of the material. Surface hardness as measured directly on a golf ball (or other spherical surface) typically results in a different hardness value. The difference in "surface hardness" and "material hardness" values is due to several factors including, but not limited to, ball construction (that is, core type, number of layers, and the like); ball (or ball sub-assembly) diameter; and the material composition of adjacent layers. It also should be understood that the two measurement techniques are not linearly related and, therefore, one hardness value cannot easily be correlated to the other. Shore hardness (for example, Shore C or Shore D hardness) was measured according to the test method ASTM D-2240.

A golf ball core made from the rubber formulation of the present disclosure may have a hardness at the geometric center of the core, referred to herein as $H_C$, that ranges from about 40 to about 90 Shore C. In one embodiment, the core has a hardness at its geometric center of about 45 to about 65 Shore C or about 48 to about 58 Shore C or about 49 to about 52 Shore C. In another embodiment, the core has a hardness at its geometric center of about 55 to about 75 Shore C or about 60 to about 66 Shore C or about 68 to about 74 Shore C. In yet another embodiment, the core has a hardness at its geometric center of about 65 to about 85 Shore C or about 66 to about 74 Shore C or about 77 to about 84 Shore C.

The hardness at the surface of the core, referred to herein as Hs, may range from about 60 to about 95 Shore C. In one embodiment, the hardness at the surface of the core is about 70 to about 95 Shore C or about 72 to about 82 Shore C or about 85 to about 95 Shore C or about 87 to about 93 Shore C. In another embodiment, the hardness at the surface of the core is about 65 to about 95 Shore C or about 73 to about 93 Shore C or about 74 to about 84 Shore C. In yet another embodiment, the hardness at the surface of the core is about 72 to about 95 Shore C or about 77 to about 85 Shore C or about 88 to about 94 Shore C.

The direction of the hardness gradient is defined by the difference in hardness measurements taken at the geometric center and outer surfaces of the core. The geometric center hardness is readily determined according to the test procedures provided above. For example, the hardness of the outer surface of the core is also readily determined according to the procedures given herein for measuring the outer surface hardness of a golf ball layer, if the measurement is made prior to surrounding the core with additional layers.

While the hardness gradient across the core will vary based on several factors including, but not limited to, the dimensions and formulations of the components, the core of the present disclosure has a "positive" hardness gradient (that is, the geometric center is softer than the outer surface of the core). More particularly, the term, "positive hardness gradient" as used herein means a hardness gradient of positive about 2 Shore C or greater, about 4 Shore C or greater, about 6 Shore C or greater, about 8 Shore C or greater, or about 10 Shore C or greater. In general, the hardness gradient may be determined by subtracting the hardness value of one component being measured (for example, the geometric center of the core, $H_C$) from the hardness value of another component being measured (for example, the outer surface of the core, $H_S$).

The core of the present disclosure has a positive hardness gradient. In one embodiment, the core has a positive hardness gradient from the geometric center to the surface of the core of about 2 Shore C to 42 Shore C. In this aspect, the positive hardness gradient of the core is about 5 Shore C to about 40 Shore C. The rubber formulation of the core may be tailored to produce a desired hardness gradient in the core. In some embodiments, the positive hardness gradient of the core is about 30 to about 42 Shore C or about 34 Shore C to 41 Shore C or about 37 Shore C to about 40 Shore C. In other embodiments, the positive hardness gradient of the core is about 3 Shore C to about 25 Shore C or about 10 Shore C to about 23 Shore C, or about 11 Shore C to about 17 Shore C. In further embodiments, the positive hardness gradient of the core may be about 2 Shore C to about 40 Shore C or about 7 Shore C to about 12 Shore C or about 8 Shore C to 11 Shore C.

The hardness of the core may not increase linearly from the center of the core to the outer surface of the core. For example, one or more regions within the core may have a "zero" hardness gradient, i.e., the hardness values across the region are substantially the same. The term, "zero hardness gradient" as used herein means a hardness gradient of –2 Shore C to 2 Shore C, preferably between about –1 Shore C and about 1 Shore C and may have a value of zero. In some embodiments, one or more regions of the core may also have a "negative" hardness gradient, i.e., the hardness values across the region may decrease from the inner edge of the region to the outer edge of the region.

For example, the core, or a layer of the core if the core has multiple layers, may be characterized by three regions: an inner region, an intermediate region, and an outer region. Each of the inner region, intermediate region, and outer region may have its own hardness gradient. For a single-layer core, the inner region is the region of the core surrounding the center of the core and is characterized by positive hardness gradient of about 2 Shore C to about 25 Shore C. In some embodiments, the positive hardness gradient of the inner region of the core is about 6 Shore C to about 25 Shore C or about 16 Shore C to about 23 Shore C. In other embodiments, the positive hardness gradient of the inner region of the core is about 1 Shore C to about 13 Shore C or about 6 Shore C to about 11 Shore C. In further embodiments, the positive hardness gradient of the inner region of the core is about 5 Shore C to about 9 Shore C or about 6 Shore C to about 8 Shore C.

The outer region of the core is the region of the core adjacent the surface of the core and may be characterized by a zero or positive hardness gradient from about –2 Shore C to about 28 Shore C. In some embodiments, the outer region may have a positive hardness gradient from 2 Shore C to about 27 Shore C or about 16 Shore C to about 27 Shore C or about 17 Shore C to about 22 Shore C. In other embodiments, the outer region may have a zero or positive hardness gradient from –2 Shore C to about 16 Shore C or about 2 Shore C to about 6 Shore C or about 10 Shore C to about 15 Shore C. In further embodiments, the outer region may have a zero or positive hardness gradient from –2 Shore C to about 14 Shore C or about 1 Shore C to about 8 Shore C or about 2 Shore C to about 6 Shore C.

The intermediate region of the core is the region of the core between the inner region and the outer region and may be characterized by a negative, zero, or positive hardness gradient from about –10 to 8 Shore C. In some embodiments, the intermediate region may have a negative, zero, or positive hardness gradient from –7 to about 6 Shore C or about –6 to about 1 Shore C. In other embodiments, the intermediate region may have a positive hardness gradient from –7 to about 4 Shore C or about –2 to about 4 Shore C. In further embodiments, the intermediate region may have a negative or zero hardness gradient from –10 to about 0 Shore C or about –4 Shore C to about 0 Shore C.

In some embodiments, a point or plurality of points measured along a "positive" gradient may be above or below a line fit through the gradient and its outermost and innermost hardness values. In an alternative embodiment, the hardest point along a particular steep "positive" gradient may be higher than the value at the innermost portion of the center (the geometric center) or outer surface of the core—as long as the outermost point (i.e., the outer surface of the core) is greater than the innermost point (i.e., the geometric center of the core), such that the "positive" gradients remain intact.

Compression

Several different methods can be used to measure compression, including Atti compression, Riehle compression, load/deflection measurements at a variety of fixed loads and offsets, and effective modulus (see, e.g., Compression by Any Other Name, Science and Golf IV, Proceedings of the World Scientific Congress of Golf (Eric Thain ed., Routledge, 2002) (J. Dalton). For purposes of the present disclosure, compression values are provided as measured by the Dynamic Compression Machine ("DCM") as well as the Soft Center Deflection Index ("SCDI"). The DCM applies a load to a ball component or a ball and measures the number of inches the core or ball is deflected at measured loads. A crude load/deflection curve is generated that is fit to the Atti compression scale that results in a number being generated that represents an Atti compression. The DCM does this via a load cell attached to the bottom of a hydraulic cylinder that is triggered pneumatically at a fixed rate (typically about 1.0 ft/s) towards a stationary core. Attached to the cylinder is an LVDT that measures the distance the cylinder travels during the testing timeframe. A software-based logarithmic algorithm ensures that measurements are not taken until at least five successive increases in load are detected during the initial phase of the test.

The SCDI is a slight variation of the DCM set up that allows determination of the pounds required to deflect a component or ball 10 percent of its diameter. With the SCDI, the goal is to obtain the pounds of force required to deflect a component or ball a certain number of inches. That amount of deflection is 10 percent of the component or ball diameter. The DCM is triggered, the cylinder deflects the component or ball by 10 percent of its diameter, and the DCM reports back the pounds of force required (as measured from the attached load cell) to deflect the component or ball by that amount. The SCDI value obtained is a single number in units of pounds.

The compression of a core made from the rubber formulation of the present disclosure may range from about 20 to about 120 DCM or more preferably about 50 to about 120 DCM. For example, the core compression may be about 50 to about 85 DCM or about 60 to 80 DCM or about 65 to about 75 DCM. In another example, the core compression may range from about 50 to about 100 DCM or about 55 to about 65 DCM or about 80 to 100 DCM. In yet another example, the core compression is about 60 to about 120 DCM or about 110 to about 120 DCM or about 60 to about 80 DCM or about 71 to about 79 DCM. In some embodiments, it may be desirable for a core comprising the rubber formulation of the present disclosure to have a compression from about 68 to about 75 DCM or from about 70 to about 74 DCM regardless of the hardening agent used.

Diameter

The diameter of the core may vary. In some embodiments, the core diameter may range from about 1.5 to about 1.58 inches. For example, the core may have a diameter of 1.53 to 1.56 inches. In embodiments where the core comprises two or more layers, the diameter of the inner layer of the core may range from about 1.0 to about 1.4 inches or from about 1.0 to about 1.2 inches.

Core Component Relationships

In one embodiment, the amount of hardening agent and the isomer of hardening agent present in the rubber formulation used to form the core are related to the hardness gradient of the core, according to the relationship shown in Equation I below:

$$\frac{HA_C * HA_{LN}}{1 - \frac{1}{H_{Gr}}} \geq 0.2 \quad (I)$$

where $HA_C$ represents the concentration of hardening agent in the rubber formulation in parts per hundred; $H_{Gr}$ represents the hardness gradient (Shore C) of the core or $H_S-H_C$, and $H_{Gr} \geq 2$; and $HA_{LN}$ represents the isomer number, i.e., the location number of the second functional group on the hardening agent. For example, if the hardening agent is 2-nitrophenol, $HA_{LN}$ is equal to 2, and if the hardening agent is 4-nitrophenol, $HA_{LN}$ is equal to 4. In another embodiment, $$\frac{HA_C * HA_{LN}}{1 - \frac{1}{H_{Gr}}} \geq 0.3$$

In still another embodiment, $$\frac{HA_C * HA_{LN}}{1 - \frac{1}{H_{Gr}}} \geq 0.4$$

In some aspects, $$0.6 < \frac{HA_C * HA_{LN}}{1 - \frac{1}{H_{Gr}}} < 0.63$$

In other aspects $$1.5 < \frac{HA_C * HA_{LN}}{1 - \frac{1}{H_{Gr}}} < 1.8$$

In yet other aspects, $$2.0 < \frac{HA_C * HA_{LN}}{1 - \frac{1}{H_{Gr}}} < 2.5$$

In another aspect, the isomer of hardening agent present in the rubber formulation used to form the core is related to the hardness gradient (Shore C) of the core according to the relationship shown in Equation II below:

$$\frac{HA_{LN}}{1 - \frac{1}{H_{Gr}}} > 2 \quad (II)$$

where $H_{Gr}$ represents the hardness gradient (Shore C) of the core or $H_S-H_C$, and $H_{Gr} \geq 2$; and $HA_{LN}$ represents the location number of the second functional group on hardening agent. In another embodiment, $$2 < \frac{HA_{LN}}{1 - \frac{1}{H_{Gr}}} < 2.2$$

In still another embodiment, $$3 < \frac{HA_{LN}}{1 - \frac{1}{H_{Gr}}} < 3.7$$

In yet another embodiment, $$4.2 < \frac{HA_{LN}}{1 - \frac{1}{H_{Gr}}} < 4.8$$

In another embodiment, the amount of hardening agent, the isomer of the hardening agent, and the amount of initiator present in the rubber formulation used to form the core are related to the hardness gradient of the core, according to the relationship shown in Equation III below:

$$\frac{HA_C * HA_{LN}}{1 - \frac{I_C}{H_{Gr}}} \geq 0.6 \quad (III)$$

where $HA_C$ represents the concentration of hardening agent in the rubber formulation in parts per hundred; $H_{Gr}$ represents the hardness gradient (Shore C) of the core, and $H_{Gr} \geq 2$; $HA_{LN}$ represents the location number of the second functional group on the hardening agent; and $I_C$ represents the concentration of the initiator in the rubber formulation in parts per hundred. In another embodiment, $$0.62 < \frac{HA_C * HA_{LN}}{1 - \frac{I_C}{H_{Gr}}} < 0.64$$

In still another embodiment, $$1.6 < \frac{HA_C * HA_{LN}}{1 - \frac{I_c}{H_{Gr}}} < 2.0$$

In still another embodiment, $$2.4 < \frac{HA_C * HA_{LN}}{1 - \frac{I_C}{H_{Gr}}} < 2.7$$

In another aspect, the amount of hardening agent and the isomer of the hardening agent present in the rubber formulation used to form the core are related to the hardness gradient of the core, according to the relationship shown in Equation IV below:

$$\frac{HA_C * HA_{LN}}{H_{Gr}^{0.2}} \geq 0.25 \qquad (IV)$$

where $HA_C$ represents the concentration of hardening agent in the rubber formulation in parts per hundred; $H_{Gr}$ represents the hardness gradient (Shore C) of the core, and $H_{Gr} \geq 2$; and $HA_{LN}$ represents the location number of the second functional group on the hardening agent. In another embodiment, $$0.25 \leq \frac{HA_C * HA_{LN}}{H_{Gr}^{0.2}} \leq 0.35$$

In still another embodiment, $$0.80 \leq \frac{HA_C * HA_{LN}}{H_{Gr}^{0.2}} \leq 0.9$$

In still another embodiment, $$1.20 \leq \frac{HA_C * HA_{LN}}{H_{Gr}^{0.2}} \leq 1.4$$

Golf Ball Construction

Golf balls having various constructions may be made in accordance with this invention. For example, golf balls having one-piece, two-piece, three-piece, four-piece, and five or more-piece constructions with the term "piece" refer to any core, cover, or intermediate layer of a golf ball construction. Representative illustrations of such golf ball constructions are provided and discussed further below. The term, "layer" as used herein means generally any spherical portion of the golf ball.

Figure 2:
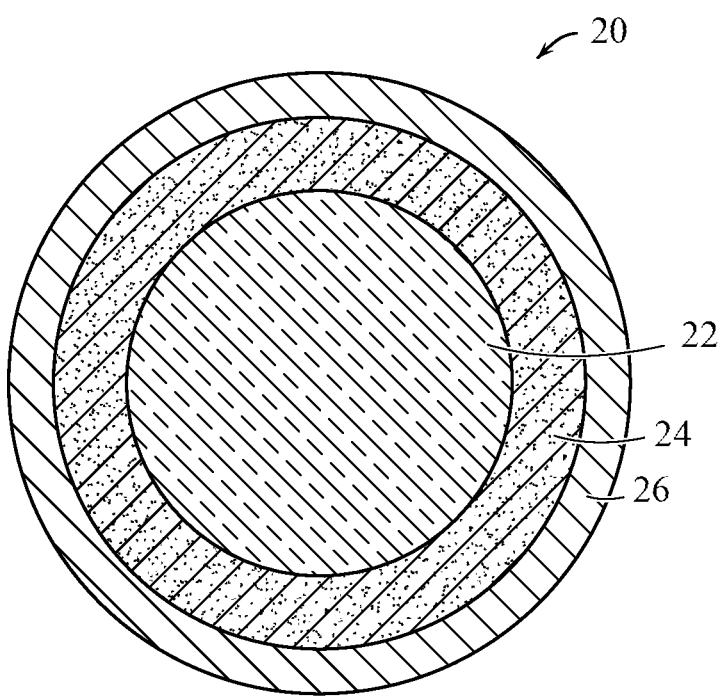
FIG. 2 is a cross-sectional view of a three-piece golf ball in accordance with an embodiment of the present disclosure.
Figure 3:
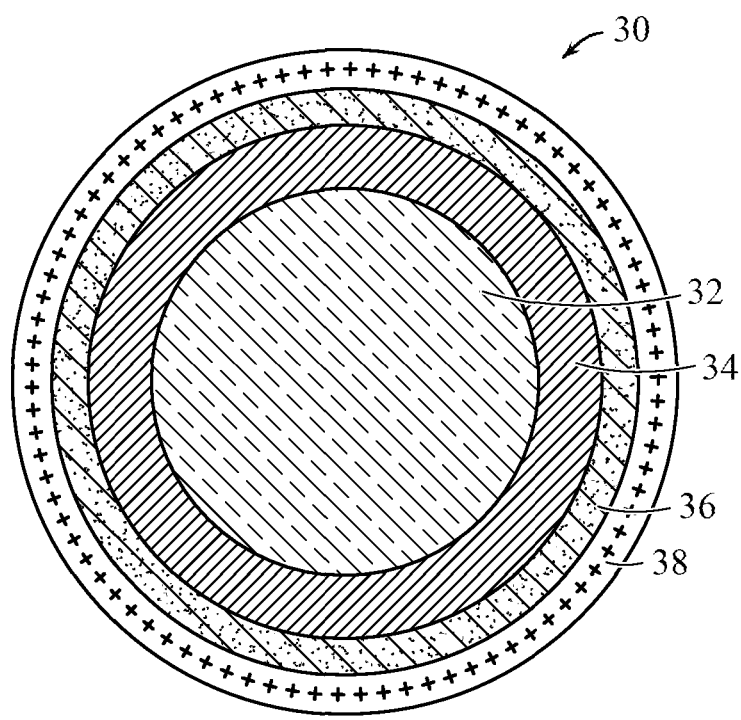
FIG. 3 is a cross-sectional view of a four-piece golf ball in accordance with an embodiment of the present disclosure.
Figure 4:
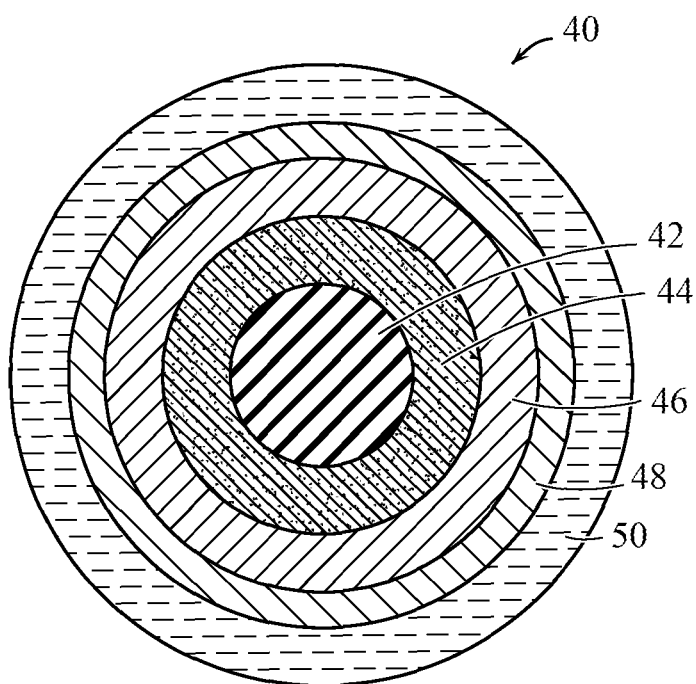
FIG. 4 is a cross-sectional view of a five-piece golf ball in accordance with an embodiment of the present disclosure.

In one embodiment, a golf ball of the present disclosure is a one-piece ball where the core and cover form a single integral layer. In another version, shown in FIG. 1, a golf ball of the present disclosure is a two-piece ball 10 comprising a single core layer 12 and a single cover layer 14. As shown in FIG. 2, in one embodiment, the golf ball 20 comprises a core layer 22, an intermediate layer 24, and a cover layer 26. In FIG. 2, the intermediate layer 24 can be considered an outer core layer, an inner cover layer, a mantle or casing layer, or any other layer disposed between the core 22 and the cover layer 26. Referring to FIG. 3, in another embodiment, a four-piece golf ball 30 comprises an inner core layer 32, an outer core layer 34, an intermediate layer 36, and an outer cover layer 38. In FIG. 3, the intermediate layer 36 may be considered a casing or mantle layer, or inner cover layer, or any other layer disposed between the outer core layer 34 and the outer cover of the ball 38. Referring to FIG. 4, in another version, a five-piece golf ball 40 comprises a three-layered core having an inner core layer 42, an intermediate core layer 44, an outer core layer 46, an inner cover layer 48, and an outer cover layer 50. As exemplified herein, a golf ball in accordance with the present disclosure can comprise any combination of any number of core layers, intermediate layers, and cover layers.

The rubber formulations discussed above are suitable for use in the core or one or more of the core layers if multiple core layers are present. It is also contemplated that the rubber formulations disclosed herein may be used to form one or more of the layers of any of the one, two, three, four, or five, or more-piece (layered) balls described above. That is, any of the core layers, intermediate layers, and/or cover layers may comprise the rubber formulation of this disclosure. The rubber formulations of different layers may be the same or different. The diameter and thickness of the different layers along with properties such as hardness and compression may vary depending upon the construction and desired playing performance properties of the golf ball.

Golf balls made in accordance with this invention can be of any size, although the USGA requires that golf balls used in competition have a diameter of at least 1.68 inches. For play outside of United States Golf Association (USGA) rules, the golf balls can be of a smaller size. In one embodiment, golf balls made in accordance with this invention have a diameter in the range of about 1.68 to about 1.80 inches.

In contrast to the core, the cover of a golf ball plays less of a role on shots off of a driver. However, because the cover plays a large role in generating spin on iron and wedge shots, the cover material and properties are still important. In this aspect, different materials may be used in the construction of the intermediate and cover layers of golf balls according to the present disclosure. For example, a variety of materials may be used for forming the outer cover including, for example, polyurethanes; polyureas; copolymers, blends and hybrids of polyurethane and polyurea; olefin-based copolymer ionomer resins; polyethylene, including, for example, low density polyethylene, linear low density polyethylene, and high density polyethylene; polypropylene; rubber-toughened olefin polymers; acid copolymers, for example, poly(meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer; cross-linked trans-polyisoprene and blends thereof; polyester-based thermoplastic elastomers; polyurethane-based thermoplastic elastomers; synthetic or natural vulcanized rubber; and combinations thereof.

In one embodiment, the cover is formed from a polyurethane, polyurea, or hybrid of polyurethane-polyurea. When used as cover layer materials, polyurethanes and polyureas can be thermoset or thermoplastic. Thermoset materials can be formed into golf ball layers by conventional casting or reaction injection molding techniques. Thermoplastic materials can be formed into golf ball layers by conventional compression or injection molding techniques.

Conventional and non-conventional materials may be used for forming intermediate layers of the ball including, for instance, ionomer resins, highly neutralized polymers, polybutadiene, butyl rubber, and other rubber-based core formulations, and the like. In one embodiment, the inner cover layer, i.e., the layer disposed between the core and the outer cover, includes an ionomer. In this aspect, ionomers suitable for use in accordance with the present disclosure may include partially neutralized ionomers and highly neutralized ionomers (HNPs), including ionomers formed from blends of two or more partially-neutralized ionomers, blends of two or more highly-neutralized ionomers, and blends of one or more partially-neutralized ionomers with one or more highly-neutralized ionomers. For purposes of the present disclosure, "HNP" refers to an acid copolymer after at least 70 percent of all acid groups present in the composition are neutralized.

Preferred ionomers are salts of O/X- and O/X/Y-type acid copolymers, wherein O is an α-olefin, X is a $C_3$-$C_8$ α, β-ethylenically unsaturated carboxylic acid, and Y is a softening monomer. O is preferably selected from ethylene and propylene. X is preferably selected from methacrylic acid, acrylic acid, ethacrylic acid, crotonic acid, and itaconic acid. Methacrylic acid and acrylic acid are particularly preferred. Y is preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate.

Preferred O/X and O/X/Y-type copolymers include, without limitation, ethylene acid copolymers, such as ethylene/(meth)acrylic acid, ethylene/(meth)acrylic acid/maleic anhydride, ethylene/(meth)acrylic acid/maleic acid monoester, ethylene/maleic acid, ethylene/maleic acid mono-ester, ethylene/(meth)acrylic acid/n-butyl (meth)acrylate, ethylene/(meth)acrylic acid/iso-butyl (meth)acrylate, ethylene/(meth)acrylic acid/methyl (meth)acrylate, ethylene/(meth) acrylic acid/ethyl (meth)acrylate terpolymers, and the like. The term, "copolymer," as used herein, includes polymers having two types of monomers, those having three types of monomers, and those having more than three types of monomers. Preferred α, β-ethylenically unsaturated mono- or dicarboxylic acids are (meth) acrylic acid, ethacrylic acid, maleic acid, crotonic acid, fumaric acid, itaconic acid. (Meth) acrylic acid is most preferred. As used herein, "(meth) acrylic acid" means methacrylic acid and/or acrylic acid. Likewise, "(meth) acrylate" means methacrylate and/or acrylate.

In a particularly preferred version, highly neutralized E/X- and E/X/Y-type acid copolymers, wherein E is ethylene, X is a $C_3$-$C_8$ α, β-ethylenically unsaturated carboxylic acid, and Y is a softening monomer are used. X is preferably selected from methacrylic acid, acrylic acid, ethacrylic acid, crotonic acid, and itaconic acid. Methacrylic acid and acrylic acid are particularly preferred. Y is preferably an acrylate selected from alkyl acrylates and aryl acrylates and preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate. Preferred E/X/Y-type copolymers are those wherein X is (meth) acrylic acid and/or Y is selected from (meth) acrylate, n-butyl (meth) acrylate, isobutyl (meth) acrylate, methyl (meth) acrylate, and ethyl (meth) acrylate. More preferred E/X/Y-type copolymers are ethylene/(meth) acrylic acid/n-butyl acrylate, ethylene/(meth) acrylic acid/methyl acrylate, and ethylene/(meth) acrylic acid/ethyl acrylate.

The amount of ethylene in the acid copolymer may be at least about 15 weight percent, at least about 25 weight percent, at least about 40 weight percent, or at least about 60 weight percent, based on total weight of the copolymer. The amount of $C_3$ to $C_8$ α, β-ethylenically unsaturated mono- or dicarboxylic acid in the acid copolymer is typically from 1 weight percent to 35 weight percent, from 5 weight percent to 30 weight percent, from 5 weight percent to 25 weight percent, or from 10 weight percent to 20 weight percent, based on total weight of the copolymer. The amount of optional softening comonomer in the acid copolymer may be from 0 weight percent to 50 weight percent, from 5 weight percent to 40 weight percent, from 10 weight percent to 35 weight percent, or from 20 weight percent to 30 weight percent, based on total weight of the copolymer.

The various O/X, E/X, O/X/Y, and E/X/Y-type copolymers are at least partially neutralized with a cation source, optionally in the presence of a high molecular weight organic acid, such as those disclosed in U.S. Pat. No. 6,756,436, the entire disclosure of which is hereby incorporated herein by reference. The acid copolymer can be reacted with the optional high molecular weight organic acid and the cation source simultaneously, or prior to the addition of the cation source. Suitable cation sources include, but are not limited to, metal ion sources, such as compounds of alkali metals, alkaline earth metals, transition metals, and rare earth elements; ammonium salts and monoamine salts; and combinations thereof. Preferred cation sources are compounds of magnesium, sodium, potassium, cesium, calcium, barium, manganese, copper, zinc, lead, tin, aluminum, nickel, chromium, lithium, and rare earth metals. The amount of cation used in the composition is readily determined based on desired level of neutralization. As discussed above, for HNP compositions, the acid groups are neutralized to 70 percent or greater, 70 to 100 percent, or 90 to 100 percent. In one embodiment, an excess amount of neutralizing agent, that is, an amount greater than the stoichiometric amount needed to neutralize the acid groups, may be used. That is, the acid groups may be neutralized to 100 percent or greater, for example 110 percent or 120 percent or greater. In other embodiments, partially neutralized compositions are prepared, wherein 10 percent or greater, normally 30 percent or greater of the acid groups are neutralized. When aluminum is used as the cation source, it is preferably used at low levels with another cation such as zinc, sodium, or lithium, since aluminum has a dramatic effect on melt flow reduction and cannot be used alone at high levels. For example, aluminum is used to neutralize about 10 percent of the acid groups and sodium is added to neutralize an additional 90 percent of the acid groups.

"Low acid" and "high acid" ionomeric polymers, as well as blends of such ionomers, may be used. In general, low acid ionomers are considered to be those containing 16 weight percent or less of acid moieties, whereas high acid ionomers are considered to be those containing greater than 16 weight percent of acid moieties. In one embodiment, the inner cover layer is formed from a composition comprising a high acid ionomer. A suitable high acid ionomer is Surlyn® 8150. (Dow), which is a copolymer of ethylene and methacrylic acid, having an acid content of 19 weight percent, 45 percent neutralized with sodium. In another embodiment, the inner cover layer is formed from a composition comprising a high acid ionomer and a maleic anhydride-grafted non-ionomeric polymer. An example of a suitable maleic anhydride-grafted polymer is Fusabond® 525D (Dow), which is a maleic anhydride-grafted, metallocene-catalyzed ethylene-butene copolymer having about 0.9 weight percent maleic anhydride grafted onto the copolymer. Blends of high acid ionomers with maleic anhydride-grafted polymers are further disclosed, for example, in U.S. Pat. Nos. 6,992,135 and 6,677,401, the entire disclosures of which are hereby incorporated herein by reference.

The inner cover layer also may be formed from a composition comprising a 50/45/5 blend of Surlyn® 8940/Surlyn® 9650/Nucrel® 960. In this aspect, the composition may have a material hardness of from 80 to 85 Shore C. In another embodiment, the inner cover layer is formed from a composition comprising a 50/25/25 blend of Surlyn® 8940/Surlyn® 9650/Surlyn® 9910, having a material hardness of about 85 to 95 Shore C. In yet another embodiment, the inner cover layer is formed from a composition comprising a 50/50 blend of Surlyn® 8940/Surlyn® 9650, having a material hardness of about 82 to 90 Shore C. A composition comprising a 50/50 blend of Surlyn® 8940 and Surlyn® 7940 also may be used.

The compositions used to make the layers outside of the core, e.g., the outer cover layer and, when present, the inner cover layer, may contain a variety of fillers and additives to impart specific properties to the ball. For example, relatively heavy-weight and light-weight metal fillers such as, particulate; powders; flakes; and fibers of copper, steel, brass, tungsten, titanium, aluminum, magnesium, molybdenum, cobalt, nickel, iron, lead, tin, zinc, barium, bismuth, bronze, silver, gold, and platinum, and alloys and combinations thereof may be used to adjust the specific gravity of the ball. Other additives and fillers include, but are not limited to, optical brighteners, coloring agents, fluorescent agents, whitening agents, UV absorbers, light stabilizers, surfactants, processing aids, antioxidants, stabilizers, softening agents, fragrance components, plasticizers, impact modifiers, titanium dioxide, clay, mica, talc, glass flakes, milled glass, and mixtures thereof.

The outer cover layer preferably has a material hardness of 85 Shore C or less. The thickness of the outer cover layer is preferably within a range having a lower limit of 0.010 or 0.015 or 0.025 inches and an upper limit of 0.035 or 0.040 or 0.055 or 0.080 inches. Methods for measuring hardness of the layers in the golf ball are described in further detail above. When included, the inner cover layer preferably has a material hardness within a range having a lower limit of 70 or 75 or 80 or 82 Shore C and an upper limit of 85 or 86 or 90 or 92 Shore C. The thickness of the intermediate layer is preferably within a range having a lower limit of 0.010 or 0.015 or 0.020 or 0.030 inches and an upper limit of 0.035 or 0.045 or 0.080 or 0.120 inches.

In one embodiment, the golf balls made in accordance with the present disclosure include a core comprising a rubber formulation as described herein, an inner cover layer formed from an ionomeric material, and the outer cover layer is formed from a polyurethane material, and the outer cover layer has a hardness that is less than that of the inner cover layer. For example, the inner cover layer may have a hardness of greater than about 60 Shore D and the outer cover layer may have a hardness of less than about 60 Shore D. In an alternative embodiment, the inner cover layer is comprised of a partially or fully neutralized ionomer, a thermoplastic polyester elastomer, a thermoplastic polyether block amide, or a thermoplastic or thermosetting polyurethane or polyurea, and the outer cover layer is comprised of an ionomeric material. In this alternative embodiment, the inner cover layer may have a hardness of less than about 60 Shore D and the outer cover layer may have a hardness of greater than about 55 Shore D and the inner cover layer hardness is less than the outer cover layer hardness.

When a dual cover is disposed about the core, the inner cover layer may have a thickness of about 0.01 inches to about 0.06 inches, about 0.015 inches to about 0.040 inches, or about 0.02 inches to about 0.035 inches. The outer cover layer may have a thickness of about 0.015 inches to about 0.055 inches, about 0.02 inches to about 0.04 inches, or about 0.025 inches to about 0.035 inches.

The golf balls of the present disclosure may be formed using a variety of application techniques. For example, the golf ball, golf ball core, or any layer of the golf ball may be formed using compression molding, flip molding, injection molding, retractable pin injection molding, reaction injection molding (RIM), liquid injection molding (LIM), casting, vacuum forming, powder coating, flow coating, spin coating, dipping, spraying, and the like. Conventionally, compression molding and injection molding are applied to thermoplastic materials, whereas RIM, liquid injection molding, and casting are employed on thermoset materials. In this aspect, cover layers may be formed over the core using any suitable technique that is associated with the material used to form the layer. Preferably, each cover layer is separately formed over the core. For example, an ethylene acid copolymer ionomer composition may be injection-molded to produce half-shells over the core. Alternatively, the ionomer composition can be placed into a compression mold and molded under sufficient pressure, temperature, and time to produce the hemispherical shells, which may then be placed around the core in a compression mold. An outer cover layer including a polyurethane or polyurea composition over the ball sub-assembly may be formed by using a casting process.

Golf balls made in accordance with the present disclosure may be subjected to finishing steps such as flash-trimming, surface-treatment, marking, coating, and the like using techniques known in the art. In one embodiment, a white-pigmented cover may be surface-treated using a suitable method such as, for example, corona, plasma, or ultraviolet (UV) light-treatment. Indicia such as trademarks, symbols, logos, letters, and the like may be printed on the cover using pad-printing, ink-jet printing, dye-sublimation, or other suitable printing methods. Clear surface coatings (for example, primer and topcoats), which may contain a fluorescent whitening agent, may be applied to the cover. Golf balls may also be painted with one or more paint coatings in a variety of colors. In one embodiment, white primer paint is applied first to the surface of the ball and then a white top-coat of paint may be applied over the primer.

Aerodynamic Characteristics

Golf ball spin rate is the amount of spin on the golf ball once the ball is hit and separates from the clubface of the golf club. Spin rate is measured by RPM (revolutions per minute). As described above, the golf balls of the present disclosure combine a core with a positive hardness gradient with a cover to tailor the spin rate to produce a desired performance on shots off of a driver and on approach shots when compared to a "conventional golf ball". For the purposes of this disclosure, the "conventional golf ball" used for comparison purposes includes a three-piece golf ball with a polybutadiene core, an inner cover layer formed from ionomer, and a polyurethane outer cover. In particular, for this spin rate comparison exercise, the inner cover and outer cover of the conventional golf ball are the same or substantially the same as the inner and outer cover layers of golf balls of the present disclosure. Additionally, both the conventional golf ball and golf balls of the present disclosure comprised a single core layer. In other words, the only variation between the conventional golf ball and the golf balls made according to the present disclosure (for the purposes of this spin rate comparison exercise) was the rubber formulation of the core.

For example, if the average spin rate of a conventional golf ball off of a driver is about 2700 rpm, the spin rate of the golf balls of the present disclosure are about the same or less by about 10 rpm to about 150 rpm, i.e., about 2550 to about 2690 rpm (all other factors held constant). In some embodiments, the spin rate of the golf balls of the present disclosure are about 20 rpm to about 100 rpm less than the spin rate of a conventional golf ball off of a driver (all other factors held constant).

In one embodiment, the driver spin rate of a golf ball made according to the present disclosure ranges from about 2000 rpm to about 3500 rpm. In another embodiment, the driver spin rate is about 2200 rpm to about 3000 rpm. In yet another embodiment, the driver spin rate is about 2550 to about 2800 rpm.

EXAMPLES

The invention is further illustrated by the following examples. It should be understood that the examples below are for illustrative purposes only. These examples should not be construed as limiting the scope of the invention.

The golf ball cores and golf balls of these examples are made using rubber formulations in accordance with the present disclosure. The compositions of the rubber formulations of each golf ball core included in the examples below is provided. These examples provide the components included in each rubber formulation. Concentrations of each component are provided in parts by weight per 100 parts of base rubber unless stated otherwise. Further, data on select characteristics, including hardness, hardness gradient, compression, COR, core weight, core diameter, and, in some cases, spin data, was collected for the golf ball cores made from the compositions. In the examples below, the hardness gradient refers the difference in the hardness at the surface and the hardness at the geometric center of the golf ball core below.

Example 1

The following examples describe golf ball cores having a single layer (solid sphere) made from rubber formulations in accordance with the present invention. The rubber formulations below include a base rubber comprised of a bend of polybutadiene rubbers, Buna CB 1221 and Buna® CB 24; a co-agent, Dymalink® 526 (zinc diacrylate); a first filler, zinc oxide (ZnO); a second filler, PolyWate® 325 (barium sulfate); a radical scavenger, Rhenogran® Zn-PCTP-72; an initiator, Perkadox® BD-FF (dicumyl peroxide); and a hardening agent, 2-nitrophenol. The compositions and properties of the cores are described in Table 1 below.

TABLE 1

| Golf Ball Cores Including 2-Nitrophenol | | | | | |
|---|---|---|---|---|---|
| | | A | B | C | D |
| Composition | Buna ® CB 1221 | 85 | 85 | 85 | 85 |
| | Buna ® CB 24 | 15 | 15 | 15 | 15 |
| | Zinc Oxide | 5 | 5 | 5 | 5 |
| | PolyWate ® 325 | 10.8 | 10.8 | 10.7 | 10.8 |
| | Rhenogran ® Zn-PCTP-72 | 0.7 | 0.7 | 0.7 | 0.7 |
| | Dymalink ® 526 | 40 | 40 | 40 | 40 |
| | Perkadox ® BD-FF | 2.0 | 2.5 | 1.5 | 2.0 |
| | 2-nitrophenol | 0.5 | 0.5 | 0.3 | 0.3 |
| Properties | Core Diameter (in) | 1.55 | 1.549 | 1.547 | 1.546 |
| | Core Weight (oz) | 1.302 | 1.304 | 1.302 | 1.302 |
| | Compression (DCM) | 62 | 56 | 78 | 74 |
| | COR | 0.794 | 0.791 | 0.804 | 0.796 |
| | Hardness at Geometric Center (Shore C) | 50 | 52.3 | 55.8 | 54.2 |
| | Hardness at 6 mm from Center (Shore C) | 67.2 | 70.2 | 75.5 | 74.8 |
| | Hardness at 14 mm from Center (Shore C) | 66 | 65.2 | 71.4 | 71.6 |
| | Hardness at Core Surface (Shore C) | 89.4 | 91.5 | 91.3 | 92.2 |
| | Hardness Gradient (Shore C) | 39.4 | 39.2 | 35.5 | 38 |

As shown in Table 1, the hardness gradient generally increases as the concentration of the hardening agent and/or initiator increases. The hardness gradient appears to plateau as the hardness gradient approaches 40 Shore C. Further, the hardness gradient from the geometric center of the core to 6 mm from the center of the core and from 14 mm from the center of the core to the surface of the core is typically greater than the hardness gradient from 6 mm from the center of the core to 14 mm from the center of the core.

Example 2

The following examples describe golf ball cores having a single layer (solid sphere) made from rubber formulations in accordance with the present invention. The rubber formulations below include a base rubber comprised of a bend of polybutadiene rubbers, Buna® CB 1221 and Buna® CB 24; a co-agent, Dymalink® 526 (zinc diacrylate); a first filler, ZnO; a second filler, PolyWate® 325 (barium sulfate); a radical scavenger, Rhenogran® Zn-PCTP-72; an initiator, Perkadox® BD-FF (dicumyl peroxide); and a hardening agent, 3-nitrophenol. The compositions and properties of the cores are described in Table 2 below.

TABLE 2

Golf Ball Cores Including 3-Nitrophenol

|  |  | A | B | C | D |
|---|---|---|---|---|---|
| Composition | Buna ® CB 1221 | 85 | 85 | 85 | 85 |
|  | Buna ® CB 24 | 15 | 15 | 15 | 15 |
|  | Zinc Oxide | 5 | 5 | 5 | 5 |
|  | Poly Wate ® 325 | 10.8 | 10.8 | 14.9 | 15 |
|  | Rhenogran ® Zn-PCTP-72 | 0.7 | 0.7 | 0.7 | 0.7 |
|  | Dymalink ® 526 | 40 | 40 | 30 | 30 |
|  | Perkadox ® BD-FF | 2 | 2.5 | 2 | 2.5 |
|  | 3-nitrophenol | 0.5 | 0.5 | 0.5 | 0.5 |
| Properties | Core Diameter (in) | 1.55 | 1.547 | 1.558 | 1.553 |
|  | Core Weight (oz) | 1.292 | 1.295 | 1.316 | 1.309 |
|  | Compression (DCM) | 97 | 97 | 57 | 62 |
|  | COR | 0.816 | 0.815 | 0.798 | 0.801 |
|  | Hardness at Geometric Center (Shore C) | 71.8 | 69.5 | 62.7 | 62.9 |
|  | Hardness at 6 mm from Center (Shore C) | 81.3 | 81.9 | 70.2 | 70.6 |
|  | Hardness at 14 mm from Center (Shore C) | 80.8 | 75.8 | 72.7 | 72.1 |
|  | Hardness at Core Surface (Shore C) | 84.1 | 90 | 78 | 83 |
|  | Hardness Gradient (Shore C) | 12.3 | 20.5 | 15.3 | 20.1 |

As shown in Table 2, the hardness gradient and compression generally increase as the concentration of the initiator increases suggesting a synergistic effect between the hardening agent and the initiator (at a minimum). The compression is also generally lower when lower concentrations of co-agent are used. Further, hardness gradient from the geometric center of the core to 6 mm from the center of the core and from 14 mm from the center of the core to the surface of the core tends to be greater than the hardness gradient from 6 mm from the center of the core to 14 mm from the center of the core.

Example 3

The following examples describe golf ball cores having a single layer made from rubber formulations in accordance with the present invention. The rubber formulations below include a base rubber comprised of a bend of polybutadiene rubbers, Buna CB 1221 and Buna® CB 24; a co-agent, Dymalink® 526 (zinc diacrylate); a first filler, ZnO; a second filler, PolyWate® 325 (barium sulfate); a radical scavenger, Rhenogran® Zn-PCTP-72; an initiator, Perkadox® BD-FF (dicumyl peroxide); and a hardening agent, 4-nitrophenol. The compositions and properties of the cores are described in Table 3 below.

Golf Ball Cores Including 4-Nitrophenol

|  |  | A | B | D | E |
|---|---|---|---|---|---|
| Composition | Buna ® CB 1221 | 85 | 85 | 85 | 85 |
|  | Buna ® CB 24 | 15 | 15 | 15 | 15 |
|  | Zinc Oxide | 5 | 5 | 5 | 5 |
|  | Poly Wate ® 325 | 10.8 | 10.8 | 14.9 | 15 |
|  | Rhenogran ® Zn-PCTP-72 | 0.7 | 0.7 | 0.7 | 0.7 |
|  | Dymalink ® 526 | 40 | 40 | 30 | 30 |
|  | Perkadox ® BD-FF | 2.0 | 2.5 | 2.0 | 2.5 |
|  | 4-nitrophenol | 0.5 | 0.5 | 0.5 | 0.5 |
| Properties | Core Diameter (in) | 1.545 | 1.544 | 1.553 | 1.551 |
|  | Core Weight (oz) | 1.301 | 1.304 | 1.315 | 1.313 |
|  | Compression (DCM) | 117 | 113 | 77 | 78 |
|  | COR | N/A | N/A | 0.803 | 0.801 |
|  | Hardness at Geometric Center (Shore C) | 80.6 | 79.8 | 70.8 | 71.6 |
|  | Hardness at 6 mm from Center (Shore C) | 88.5 | 87.4 | 78.3 | 78.3 |
|  | Hardness at 14 mm from Center (Shore C) | 83.5 | 78.8 | 76.2 | 75.6 |
|  | Hardness at Core Surface (Shore C) | 89.9 | 92 | 81.3 | 83.2 |
|  | Hardness Gradient (Shore C) | 9.3 | 12.2 | 10.5 | 11.6 |

As shown in Table 3, the hardness gradient generally increase as the concentration of the initiator increases suggesting a synergistic effect between the hardening agent and the initiator (at a minimum) and the compression generally decreases as the concentration of co-agent increases. Further, hardness gradient from the geometric center of the core to 6 mm from the center of the core and from 14 mm from the center of the core to the surface of the core is greater than the hardness gradient from 6 mm from the center of the core to 14 mm from the center of the core.

Example 4

The following examples describe golf ball cores having a single layer made from rubber formulations in accordance with the present invention. The rubber formulations include a base rubber comprised of a bend of polybutadiene rubbers, Buna® CB 1221 and Buna® CB 24; a co-agent, Dymalink® 526 (zinc diacrylate); a first filler, ZnO; a second filler, PolyWate® 325 (barium sulfate); a radical scavenger, Rhenogran® Zn-PCTP-72; an initiator, Perkadox® BD-FF (dicumyl peroxide). In the examples below, different hardening agents are used. The hardening agents include 2-nitrophenol (ortho), 3-nitrophenol (meta), and 4-nitrophenol (para). In addition to data about the hardness, hardness gradient, compression, COR, core weight, and core diameter, the examples below also include spin data. For collecting spin data, the cores described below were made into golf balls including an inner cover layer formed from ionomer and a thin polyurethane outer cover. The compositions, properties and spin data of example cores are shown below Table 4.

TABLE 4

Golf Ball Cores Including Nitrophenol

|  |  | A | B | C |
|---|---|---|---|---|
| Composition | Buna ® CB 1221 | 85 | 85 | 85 |
|  | Buna ® CB 24 | 15 | 15 | 15 |
|  | Zinc Oxide | 5 | 5 | 5 |
|  | Poly Wate ® 325 | 10.7 | 13.5 | 15.2 |
|  | Rhenogran ® Zn-PCTP-72 | 0.7 | 0.7 | 0.7 |
|  | Dymalink ® 526 | 40 | 33 | 29 |
|  | Perkadox ® BD-FF | 1.5 | 2 | 2 |
|  | Nitrophenol Isomer | Ortho | Meta | Para |
|  | Nitrophenol | 0.5 | 0.5 | 0.5 |

TABLE 4-continued

Golf Ball Cores Including Nitrophenol

|  |  | A | B | C |
|---|---|---|---|---|
| Core | Core Diameter (in) | 1.529 | 1.533 | 1.533 |
| Properties | Core Weight (oz) | 1.252 | 1.258 | 1.262 |
|  | Compression (DCM) | 71 | 72 | 73 |
|  | COR | 0.801 | 0.803 | 0.802 |
|  | Hardness at Geometric Center(Shore C) | 50.3 | 64.7 | 70.3 |
|  | Hardness at 6 mm from Center (Shore C) | 72.1 | 73.6 | 77.2 |
|  | Hardness at 14 mm from Center (Shore C) | 69.8 | 75.6 | 76 |
|  | Hardness at Core Surface (Shore C) | 88.3 | 79.6 | 78.8 |
|  | Hardness Gradient (Shore C) | 38 | 14.9 | 8.5 |
| Ball | Ball Diameter (in) | 1.683 | 1.683 | 1.683 |
| Properties | Ball Weight (oz) | 1.602 | 1.598 | 1.602 |
|  | Compression (DCM) | 99 | 95 | 93 |
|  | COR | 0.818 | 0.820 | 0.820 |
| Spin | Spin Rate with Driver (rpm) | 2683 | 2681 | 2723 |
| Data | Spin Rate with Hybrid (rpm) | 4155 | 4100 | 4266 |
|  | Spin Rate with Iron (rpm) | 6389 | 6386 | 6651 |
|  | Spin Rate with Full Wedge (rpm) | 9213 | 9165 | 9418 |
|  | Spin Rate with Half Wedge (rpm) | 6905 | 6862 | 6910 |

As shown in Table 4, the hardness gradient of a core is generally higher if the hardening agent is 2-nitrophenol than if the hardening agent is 3-nitrophenol and is generally higher if the hardening agent is 3-nitrophenol than if the hardening agent is 4-nitrophenol. Table 4 also indicates that altering the distance between the substituent on disubstituted benzoic hardening agent (i.e., changing the hardening agent from 2-nitrophenol to 3-nitrophenol or 4-nitrophenol) generally has a greater effect on the hardness gradient than altering the concentration of the initiator, however, this may not hold true for large changes (greater than those tested) in the initiator concentration. It is also noted that the compression of the golf ball cores shown in Table 4 are relatively similar despite changes in the hardening agent. Without being bound to any theory, this may be attributable to changes in the concentration of co-agent used with different hardening agents to compensate for the hardening agent's effect on core compression.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Numerical quantities given in this description are approximate unless stated otherwise, meaning that the term "about" or "approximately" can be inferred when not expressly stated.

The terminology used herein is for the purpose of describing particular embodiments only and is not intended to be limiting. As used herein, the singular forms "a", "an" and "the" are intended to include the plural forms as well (i.e., at least one of whatever the article modifies), unless the context clearly indicates otherwise.

The terms "first," "second," and the like are used to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the disclosure. Likewise, terms like "top" and "bottom"; "front" and "back"; and "left" and "right" are used to distinguish certain features or elements from each other, but it is expressly contemplated that a top could be a bottom, and vice versa.

The golf balls described and claimed herein are not to be limited in scope by the specific embodiments herein disclosed, since these embodiments are intended as illustrations of several aspects of the disclosure. Any equivalent embodiments are intended to be within the scope of this disclosure. Indeed, various modifications of the device in addition to those shown and described herein will become apparent to those skilled in the art from the foregoing description. Such modifications are also intended to fall within the scope of the appended claims. All patents and patent applications cited in the foregoing text are expressly incorporated herein by reference in their entirety. Any section headings herein are provided only for consistency with the suggestions of 37 C.F.R. § 1.77 or otherwise to provide organizational queues. These headings shall not limit or characterize the invention (s) set forth herein.

What is claimed is:

1. A golf ball, comprising:
   a core comprising:
      a rubber formulation including a base rubber and a hardening agent having a hardening agent concentration $HA_C$ and a hardening agent isomer number $HA_{LN}$;
      a geometric center hardness $H_C$;
      a surface hardness $H_S$; and
      a hardness gradient $H_{Gr}$ equal to the difference between $H_C$ and $H_S$,
      wherein the hardening agent is nitrophenol and $$\frac{HA_C * HA_{LN}}{1 - \frac{1}{H_{Gr}}} \geq 0.4;$$

and
   a cover layer disposed about the core.

2. The golf ball of claim 1, wherein $$0.6 < \frac{HA_C * HA_{LN}}{1 - \frac{1}{H_{Gr}}} < 0.63.$$

3. The golf ball of claim 1, wherein $$1.5 < \frac{HA_C * HA_{LN}}{1 - \frac{1}{H_{Gr}}} < 1.8.$$

4. The golf ball of claim 1, wherein $$2.0 < \frac{HA_C * HA_{LN}}{1 - \frac{1}{H_{Gr}}} < 2.5.$$

5. The golf ball of claim 1, wherein $HA_C$ is about 0.1 to about 1.0 parts per hundred rubber.

6. The golf ball of claim 1, wherein $H_C$ is in the range of about 50 Shore C to about 85 Shore C, $H_S$ is in the range of about 65 Shore C to about 95 Shore C, and $H_S$ is greater than $H_C$.

7. The golf ball of claim 1, wherein the rubber formulation further comprises a co-agent, a filler, and an initiator.

8. The golf ball of claim 1, wherein the rubber formulation further comprises a radical scavenger.

9. The golf ball of claim 1, wherein the base rubber is polybutadiene rubber, butyl rubber, or a blend thereof.

10. A golf ball, comprising:
   a core comprising:
      a rubber formulation including a base rubber, an initiator having an initiator concentration $I_C$, and a hardening agent having a hardening agent concentration $HA_C$ and a hardening agent isomer number $HA_{LN}$;
      a geometric center hardness $H_C$;
      a surface hardness $H_S$; and
      a hardness gradient $H_{Gr}$ equal to the difference between $H_C$ and $H_S$,
      wherein the hardening agent is nitrophenol and $$\frac{HA_C * HA_{LN}}{1 - \frac{I_c}{H_{Gr}}} \geq 0.6;$$

and
   a cover layer disposed about the core.

11. The golf ball of claim 10, wherein $$0.62 < \frac{HA_C * HA_{LN}}{1 - \frac{I_C}{H_{Gr}}} < 0.64.$$

12. The golf ball of claim 10, wherein $$1.6 < \frac{HA_C * HA_{LN}}{1 - \frac{I_C}{H_{Gr}}} < 2.0.$$

13. The golf ball of claim 10, wherein $$2.4 < \frac{HA_C * HA_{LN}}{1 - \frac{I_C}{H_{Gr}}} < 2.7.$$

14. The golf ball of claim 10, wherein $HA_C$ is about 0.1 to about 1.0 parts per hundred rubber.

15. The golf ball of claim 10, wherein $I_C$ is about 0.5 to about 3.0 parts per hundred rubber.

16. The golf ball of claim 10, wherein $H_C$ is in the range of about 50 Shore C to about 85 Shore C, Hs is in the range of about 65 Shore C to about 95 Shore C, and Hs is greater than $H_C$.

17. A golf ball, comprising:
   a core comprising:
      a rubber formulation including a base rubber and a hardening agent, wherein the hardening agent is a benzoic compound comprising a first functional group that is a nitro functional group and a second functional group that is selected from the group consisting of hydroxyl, amino, and sulfhydryl functional groups;
      a geometric center having a hardness;
      a geometric surface having a hardness;
      a hardness gradient equal to the difference in the geometric center hardness and the surface hardness, wherein the hardness gradient is between 2 Shore C and 42 Shore C; and
   a cover layer disposed about the core.

18. The golf ball of claim 17, wherein the hardening agent is nitrophenol.

19. The golf ball of claim 18, wherein the hardening agent is 2-nitrophenol and the hardness gradient is between 30 Shore C and 42 Shore C.

20. The golf ball of claim 18, wherein the cover layer comprises a material selected from the group consisting of polyurethanes, polyureas, and hybrids, copolymers, and blends thereof.

* * * * *